(12) United States Patent
Li

(10) Patent No.: US 7,103,314 B2
(45) Date of Patent: Sep. 5, 2006

(54) SYSTEM AND METHOD OF CONFORMING WIRELESS DEVICES TO WORLDWIDE REGULATIONS

(75) Inventor: Sheung Li, Mountain View, CA (US)

(73) Assignee: Atheros Communications, Inc., Santa Clara, CA (US)

( * ) Notice: Subject to any disclaimer, the term of this patent is extended or adjusted under 35 U.S.C. 154(b) by 345 days.

(21) Appl. No.: 10/330,486

(22) Filed: Dec. 27, 2002

(65) Prior Publication Data

US 2004/0127240 A1 Jul. 1, 2004

(51) Int. Cl.
*H04B 7/00* (2006.01)

(52) U.S. Cl. ............... 455/41.2; 455/426.1; 455/435.3; 455/450; 455/552.1

(58) Field of Classification Search ....... 455/41.1–41.3, 455/426.1, 426.2, 435.2, 435.3, 450, 552.1, 455/451, 452.1, 452.2, 90.1, 161.1, 161.3, 455/466, 454
See application file for complete search history.

(56) References Cited

U.S. PATENT DOCUMENTS

2002/0176366 A1 * 11/2002 Ayyagari et al. ............ 370/245
2003/0158922 A1 * 8/2003 Park .......................... 709/222
2003/0210658 A1 * 11/2003 Hernandez et al. ......... 370/311

OTHER PUBLICATIONS

IEEE, "Wireless LAN Medium Access Control (MAC) and Physical Layer (PHY) Specifications", Jul. 13, 2001, pp. 2–5.*

* cited by examiner

*Primary Examiner*—Charles Craver
(74) *Attorney, Agent, or Firm*—Bever, Hoffman & Harms, LLP; Jeanette S. Harms

(57) ABSTRACT

Countries or regions of the world can have different regulations governing wireless devices. A client product advantageously conforms to any regulatory environment, thereby allowing the client product to operate permissibly in any wireless network. The client product scans all frequencies at a predetermined interval for explicit information on regulation-conformant methods of operation, including frequencies and output power levels. If the client product receives a beacon, then the client product extracts relevant information from the beacon. Based on the relevant information, the client product operates in either the infrastructure mode or the ad hoc mode. On the other hand, if the client product does not receive explicit information, the client product detects other types of information and implicitly derives methods of operation in both infrastructure and ad hoc modes that conform to local regulations.

17 Claims, 7 Drawing Sheets

SYSTEM AND METHOD OF CONFORMING WIRELESS DEVICES TO WORLDWIDE REGULATIONS

BACKGROUND OF THE INVENTION

1. Field of the Invention

The invention relates to wireless devices that conforms to the 1999 IEEE 802.11 standard or the updated 2003 IEEE 802.11 standard. Specifically, the invention relates to ensuring that such wireless devices also conform to the regulations governing such wireless devices in various countries worldwide.

2. Description of the Related Art

Many devices currently have the capability to communicate without the use of a wired network. Such devices can include, for example, laptops and personal digital assistants (PDAs). These devices can use a wireless local area network (WLAN), which can operate separately from or operate in conjunction with an existing wired network.

Wireless communication can be characterized by two modes of operation: an infrastructure mode and an ad hoc mode. FIG. 1A illustrates an infrastructure mode, wherein an access point AP1 communicates with a plurality of clients C1, C2, and C3. Note that in order for client C1 to communicate with client C3 in infrastructure mode, client C1 must communicate via access point AP1. Thus, access point AP1 functions as a communication hub between clients C1, C2, and C3.

Access point AP1 also serves as a gateway for clients C1, C2, and C3 to communicate with clients not associated with access point AP1. For example, access point AP1 can communicate with another access point, such as access point AP2, which in turn can be associated with a plurality of clients C4 and C5. Because a client can be a mobile device and each access point has a predetermined range of service, a client may associate with an access point for a first time period and then associate with another access point for a second time period. For example, client C3, which is communicating with client C2, could at some time be outside the range of access point AP1. At this point, client C3 could disassociate from access point AP1 and associate with access point AP2, as indicated by dashed lines, thereby ensuring that its communication to client C2 is maintained.

In contrast, FIG. 1B illustrates an ad hoc mode, wherein clients C1, C2, and C3 can communicate directly without an access point. In this mode, each client would have access to the resources of the other clients, but not to the resources of an access point, which typically includes a central server. Therefore, communication in the infrastructure mode can generally support more complex and volume intensive use.

The IEEE 802.11d standard, which was published as a supplemental standard in 2001, provides a beacon format to be used in the infrastructure mode. Specifically, an AP normally broadcasts an information element (i.e. a beacon), which includes information for identifying and defining the wireless network, such as its name and security level. Additionally, the information element may include information regarding country, regulatory domain, frequency, and power levels. This type of information element is called an 802.11d beacon herein.

However, the 802.11d standard fails to define a protocol on how to use this information or what to do when this information is imperfect, incomplete, or simply not applicable to the product that receives it. For example, if the client product is an 802.11a product (operating at 5 GHz) and is operating near an AP broadcasting an 802.11d beacon for an 802.11b product (operating at 2.4 GHz), then the client product is unlikely to respond at all or, alternatively, might not respond to the beacon in a permissible manner (thereby risking a product ban or other import/financial penalties in that country). Therefore, a need arises for a client product to determine where it is and to operate properly in both infrastructure and ad hoc modes, even when the information element provides information that is imperfect, incomplete, or different than anticipated.

SUMMARY OF THE INVENTION

Countries or regions of the world can have different regulations governing wireless devices. Thus, wireless devices are currently programmed to operate within a specific country or a region of the world as well as in a specific mode, i.e. the infrastructure or ad hoc mode. If a person attempts to use his/her wireless device in another country/region of the world or in a different mode than that programmed, then the wireless device is inoperable or operates in an impermissible manner. These limitations are highly undesirable in our increasingly mobile society.

In accordance with one aspect of the invention, a client product can advantageously conform to any regulatory environment, thereby allowing the client product to operate permissibly in any wireless network. Of importance, at an initial startup, the client product can passively scan all frequencies at a first interval for a beacon. If the client product receives a beacon, then the client product can extract relevant information from the beacon. Based on the relevant information, the client product can operate according to appropriate regulatory parameters in either the infrastructure mode or the ad hoc mode. Even if the client product does not receive a valid 802.11d beacon, the client product can still operate in an appropriate mode for substantially all regulatory environments.

In one embodiment, if the client product does not receive a beacon and is set to the infrastructure mode, then the client product can continue to passively scan all frequencies at progressively longer intervals for the beacon. Each successive scan interval can be considerably longer than the earlier intervals, thereby increasing the likelihood of receiving a valid beacon. For example, a client product could scan each frequency for 150 ms for a first interval and could scan each frequency for 300 ms for a second interval.

If the client product receives an incomplete or non-applicable information element, then the client product can determine whether an implicit regulatory domain can be derived from that information element. An implicit regulatory domain refers to a set of regulatory information that would be in a valid information element that could be derived by inspecting the frequencies and modes of operation used by an incomplete or non-applicable information element. If these frequencies and/or modes of operation are only used in a certain regulatory domain, the client product could derive a complete set of regulatory information for that regulatory domain without explicitly receiving a complete and valid 802.11d beacon. If the client product instead receives an 802.11d beacon, then the client product can operate in its set mode, i.e. the infrastructure mode or the ad hoc mode, based on the regulatory information explicitly indicated in the 802.11d beacon.

In accordance with one feature of the invention, an automatic startup process for a client product in a wireless network is provided. Advantageously, the process ensures permissible operation in an unknown regulatory environment. This process can include passively scanning all frequencies at a first interval for a beacon. If an 802.11d beacon is found, then a determination can be made whether the client product is set in the infrastructure mode (first instance). If the client product is set in the infrastructure mode, then the client product can associate in the infrastructure mode in the wireless network using relevant information provided in the 802.11d beacon. This relevant information includes a regulatory domain and a conformance test limit (CTL). If the client product is not set in the infrastructure mode, i.e. is set in the ad hoc mode, then the client product can operate in the ad hoc mode in the wireless network, once again using the regulatory domain and the CTL provided in the 802.11d beacon. Thus, even when the client product is set to the ad hoc mode, the client product can extract useful information from the information element even though the 802.11d beacon is intended exclusively for use in the infrastructure mode.

If an information element is found and the client product is set in the ad hoc mode, then the process can further include searching for an ad hoc beacon (first instance). If an ad hoc beacon is found, then the client product can associate in the ad hoc mode in an existing wireless network. On the other hand, if an ad hoc beacon is not found, then the client product can initiate a new wireless network and then begin its operation in the ad hoc mode. Note that operation in the ad hoc mode still advantageously uses the regulatory domain and conformance test limit that were provided in the information element.

If an information element is not found, then the process can include searching for any beaconed information at progressively longer intervals. If no beacon is found at that point, then the process can include determining whether the client product is set in the infrastructure mode (second instance). If the client product is not set in the infrastructure mode, then a specific search can start for an ad hoc beacon. If an ad hoc beacon is found, then the client product can associate in a common mode in the wireless network. The common mode refers to a maximum average output power level meeting substantially all regulatory environments. In one embodiment, the common mode includes one of 17 dBm for 5.15 GHz to 5.25 GHz, 20 dBm for 5.25 GHz to 5.85 GHz to 5.99 GHz, and 20 dBm for 2.4 GHz to 2.50 GHz. If an ad hoc beacon is not found, then the client product can initiate its own ad hoc network using a frequency acceptable in substantially all regulatory environments. In one embodiment, the frequency includes the 2.457 GHz radio channel in the 802.11b specification.

If an 802.11d beacon is not found, but some other information element is, then the process can include determining whether an implicit regulatory domain is provided in the information element. An implicit regulatory domain refers to a set of regulatory information that would be in a valid information element that could be derived by inspecting the frequencies and modes of operation used by an incomplete or non-applicable information element. If these frequencies and/or modes of operation are only used in a certain regulatory domain, the client product could derive a complete set of regulatory information for that regulatory domain without explicitly receiving a complete and valid 802.11d beacon. If an implicit regulatory domain cannot be derived, then the process can return to determining whether the client is set in the infrastructure mode (second instance). On the other hand, if an implicit regulatory domain is provided, then only the regulatory domain and a conformance test limit (CTL) are saved. In this case, if the client product is set in the infrastructure mode, then the client product can associate in the infrastructure mode in the wireless network based on the regulatory domain and the CTL. If the client product is not set in the infrastructure mode, then the client product can return to searching for an ad hoc beacon (first instance).

If after unsuccessfully searching for any beacon and the client is set in the infrastructure mode, then all frequencies can be passively scanned at a second interval. In one embodiment, the second interval can be significantly longer than the first interval. If an information element is found during the second interval, then the client product can associate in the infrastructure mode in the wireless network based on a regulatory domain and a conformance test limit (CTL) derived from the information element. If the information element is not found during the second interval, then the process can include searching for any beacon (second instance). If a beacon is not found, then an ad hoc mode can be started at a frequency acceptable in substantially all regulatory environments, as explained above. If some beacon is found, then a determination can be made as to whether an implicit regulatory domain is provided in the beacon. If an implicit regulatory domain is provided, then only the regulatory domain and a conformance test limit (CTL) is saved. At this point, the client product can associate in the infrastructure mode in the wireless network based on the regulatory domain and the CTL. If an implicit regulatory domain is not provided, then the client product can associate in the infrastructure mode in the common mode.

In one embodiment, the startup operation can be implemented using software in the wireless device. The software can include code for performing each of the above-described steps. In one embodiment, a system for ensuring permissible operation of a wireless device in an unknown regulatory environment can include means for passively scanning all frequencies at progressively longer intervals for any beacon, means (if receiving an information element) for extracting relevant information from the information element and operating in one of an infrastructure mode and an ad hoc mode based on the relevant information, and means (if not receiving an information element) for operating in the infrastructure or ad hoc modes at frequencies and power levels acceptable in substantially all regulatory environments.

In accordance with another feature of the invention, a method for conforming a client product in a wireless network to a regulatory environment is provided. However, in this case, the client product has already finished its initial startup. This method can include determining whether a regulatory domain is set. If the regulatory domain is set, then the regulatory domain and an associated conformance test limit can be used as a temporary setting. If permissible, an active scan can be performed in the regulatory domain. If impermissible, then a passive scan can be performed. If a beacon is detected based on the scanning (whether active or passive), then the regulatory domain can be reset if different and the temporary setting can be converted into a confirmed setting. If no beacon is detected, then foreign domains can be passively scanned until a beacon is detected. The client product can then associate in the wireless network based on the regulatory domain in the confirmed setting.

BRIEF DESCRIPTION OF THE FIGURES

FIG. 3 illustrates a process flow when a client product detects an 802.11d beacon and is set in the infrastructure mode.

FIG. 4 illustrates a process flow when a client product detects an 802.11d beacon, but is set in the ad hoc mode.

FIG. 5 illustrates a process flow when a client product fails to detect an 802.11d beacon, but attempts to extract information from an information element.

FIG. 6 illustrates a process flow when a client product fails to detect any beacon (or cannot imply a regulatory domain from a beacon) using a first scanning interval and therefore increases that scanning interval to detect a beacon.

FIG. 7 illustrates an exemplary process flow when a client product has a set regulatory domain, but can confirm or change such regulatory domain based on other information elements it receives.

DETAILED DESCRIPTION OF THE FIGURES

Figure 1A:
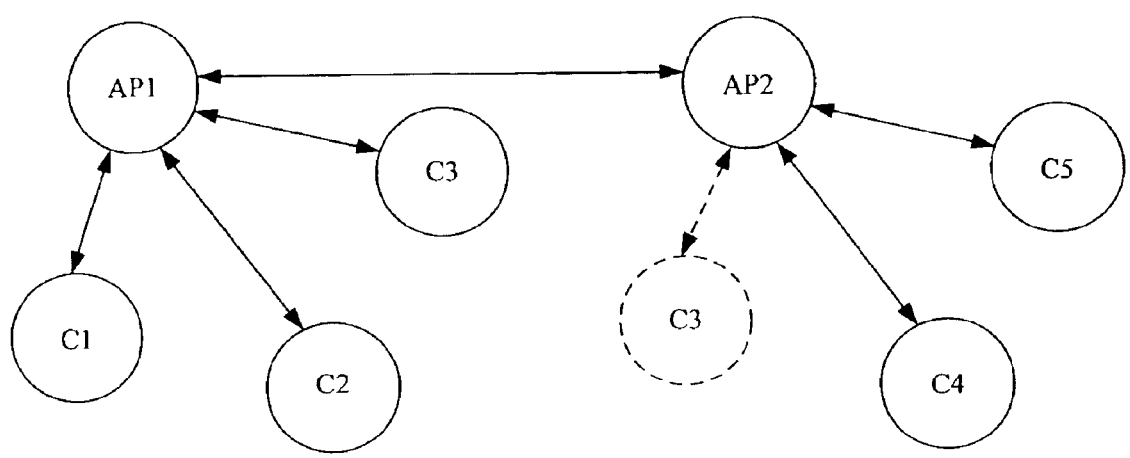
FIG. 1A illustrates an infrastructure mode, wherein an access point can communicate with a plurality of clients.
Figure 1B:
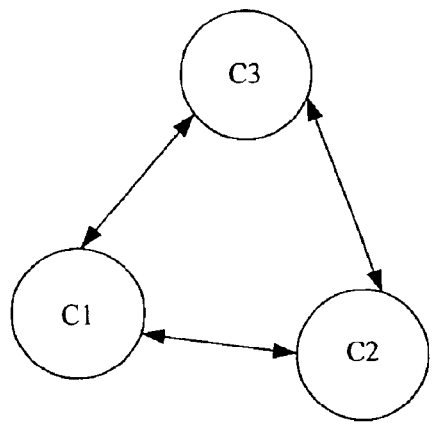
FIG. 1B illustrates an ad hoc mode, wherein peers can communicate directly without an access point.

In accordance with one aspect of the invention, access point (AP) and client products can operate in different countries/regions while conforming to the appropriate regulatory requirements. The operation of the AP products and client products can be substantially automated, thereby advantageously requiring minimal user intervention, which simplifies operation of the AP products, as well as minimal geographical customization of products by manufacturer, which significantly reduces fabrication costs.

Terminology

The following terms are defined to facilitate understanding certain features of the access point (AP) and client products. Note that for simplicity some terms may be referenced as acronyms in the figures. These acronyms are also used in various sections of the description. Further note that some terms may have multiple meanings. In this case, the context of the usage of the term can be used to determine the appropriate meaning.

The "common mode" refers to the maximum average output power level that meets all regulatory domain requirements. In the 802.11d beacon, both the appropriate frequencies of operation (measured in GHz) and the appropriate power levels (measured in dBm or mW) can be broadcast. Regulations for a wireless network provide a correlation between a power level and a frequency (or frequency range). For example, a power level of 17 dBm corresponds to a frequency between 5.15 and 5.25 GHz, a power level of 20 dBm corresponds to a frequency between 5.25 and 5.85 GHz, and a power level of 20 dBm corresponds to a frequency between 2.40 and 2.50 GHz. (In one embodiment, the common mode excludes power levels of 17 dBm between 2.40 and 2.50 GHz used in Chile. Note that these listed correspondences between power and frequency may change over time and thus are provided for illustration only.

However, regardless of a power/frequency correspondence at any point in time, common mode capability means that the lower of a card's maximum output power and a regulatory domain's limit is stored in non-volatile memory. For example, assume a card is capable of an output power of 23 dBm for a 5.20 GHz channel. In the FCC1 (United States) regulatory domain, the regulatory limit is 20 dBm. In contrast, in the FCC2 (Canada) regulatory domain, the limit is 23 dBm EIRP. In this example, the common mode power is 20 dBm, but the software would set the card for 20 dBm operation in the United States and 23 dBm in Canada.

A "conformance test limit" (CTL) refers to data representing output power as well as band edge limits determined by conformance test of production product. The band edge limits refer to rules used to measure the edges of the frequency bands. For example, although the United States and Canada both use the 2.4 GHz frequency band, i.e. from 2.400 GHz to 2.483 GHz, the United States has a specific rule that applies to frequencies at the edges of that band. Specifically, a certain protected service is provided immediately adjacent the edge. Therefore, a product (access point or client) would normally be designed in the United States at slightly lower power, thereby ensuring that the product is not inadvertently identified as operating at the protected service frequency. Furthermore, variations in the actual output power of specific products may require setting a CTL that is different than nominal regulatory requirements to compensate for design elements such as enclosures. Typically, one or more CTLs can be stored in the hardware of the product (e.g. the non-volatile memory or the driver, depending on the product configuration) to correspond to the requirements of different countries and frequencies. For example, multiple 5 GHz and 2.4 GHz CTLs can reside simultaneously in the non-volatile memory of a product. In one embodiment, the CTL for a product specifies a 1 dB power back off at 2.462 GHz to meet FCC1 (United States) regulatory requirements.

A "country code" (CC) refers to one or more codes that designate the country in which a product is operating. One country code format uses an ISO code (published by the International Organization for Standardization), i.e. a 2 character alphabetic code, used in the 802.11d beacon. (For example, DE represents Germany, US represents the United States, etc.) Another country code uses a UN code, i.e. a 12 bit numeric code, stored in the software of a pre-programmed product. (For example, the hex code 0x20 could represent Argentina, the hex code 0x1E1 could represent Mexico, etc.) Note that the UN code and the ISO code can describe a different set of countries (i.e. one code may recognize a country not recognized by the other code). Moreover, the 12 bit UN code allows over a thousand countries to be identified, whereas somewhere between 190 and 250 countries are currently designated by various other organizations. Therefore, in one embodiment, the country code can also include proprietary codes used to indicate multiple countries (i.e. see definition of region below). These proprietary codes can follow the format of the UN codes, but use designations not previously assigned. For example, a worldwide (WOR) designation for products capable of being used in all countries in the world can be included in a proprietary code.

A "country table" refers to a lookup table that can include mappings of each country code (CC) to an applicable regulatory domain (RD). The country table can be provided in the software or the driver.

A "foreign domain" refers to any regulatory domain other than that currently in use. Logically, there is no foreign domain for the world domain.

A "region" refers to a set of countries constituting a market into which a single stock keeping unit (SKU) is sold, but which utilize one or more regulatory domains (RDs). The European Community is an example of a region.

A "regulatory domain" (RD) refers to a data set regarding frequency limitations, maximum transmit power levels, and conformance test limits applicable to a country or region.

Any combination of a country code and regulatory domain select flag will map to a particular regulatory domain. In one embodiment, eleven regulatory domains are defined for 802.11a operation (e.g. FCC1, ETSI1, ETSI2, etc.) (see Table 1), whereas seven regulatory domains are defined for 802.11b/g operation (see Table 2). A default regulatory domain may be loaded and stored in software upon first use of a product. Regulatory domain can also be used to designate the country or region to which the data corresponds. In one embodiment, the regulatory domain can be entered as a hex code in the non-volatile memory (e.g. FCC1_FCCA could be entered as 0x10, MKK1_MKKA could be entered as 0x40, etc.)

A "regulatory domain select" (RDS) refers to a 1-bit flag that indicates whether a country code designates a specific country code or a proprietary code. For example, in one embodiment, if the regulatory domain select is "set", then the country code indicates the country code of a country for which the card is initially configured. If the regulatory domain select is not set, then the country code indicates the proprietary regulatory domain code of the region for which the card is initially configured. The latter can be used to indicate configuration for sale in multiple countries, as approved for all products sold in regions (such as those under ETSI rules). For example, one of the proprietary region codes could be a world domain that indicates the product may be shipped worldwide.

A "stock keeping unit" (SKU) refers to a separate product variant, which is typically designated by a separate part number. Hardware SKU results from any difference in component composition, calibration, or other setting stored on any device in hardware. Software SKU results from any difference in host driver software, application software, or software-based configuration settings. Note that differences in MAC addresses, serial numbers or related product designators do not result in a separate SKU. As used herein, SKU can generically refer to any variation that leads to a separate hardware or software SKU. In accordance with one aspect of the invention, customers can create a worldwide SKU product with worldwide roaming features.

"transmit power table" (TPT) refers to data stored in hardware that can indicate the maximum output power capability of the product. The TPT is independent of the output power limit for various regulatory domains. In one embodiment, the TPT also includes the frequency associated with the maximum output power.

Process Flows for Worldwide Conformance: General Overview

Figure 2:
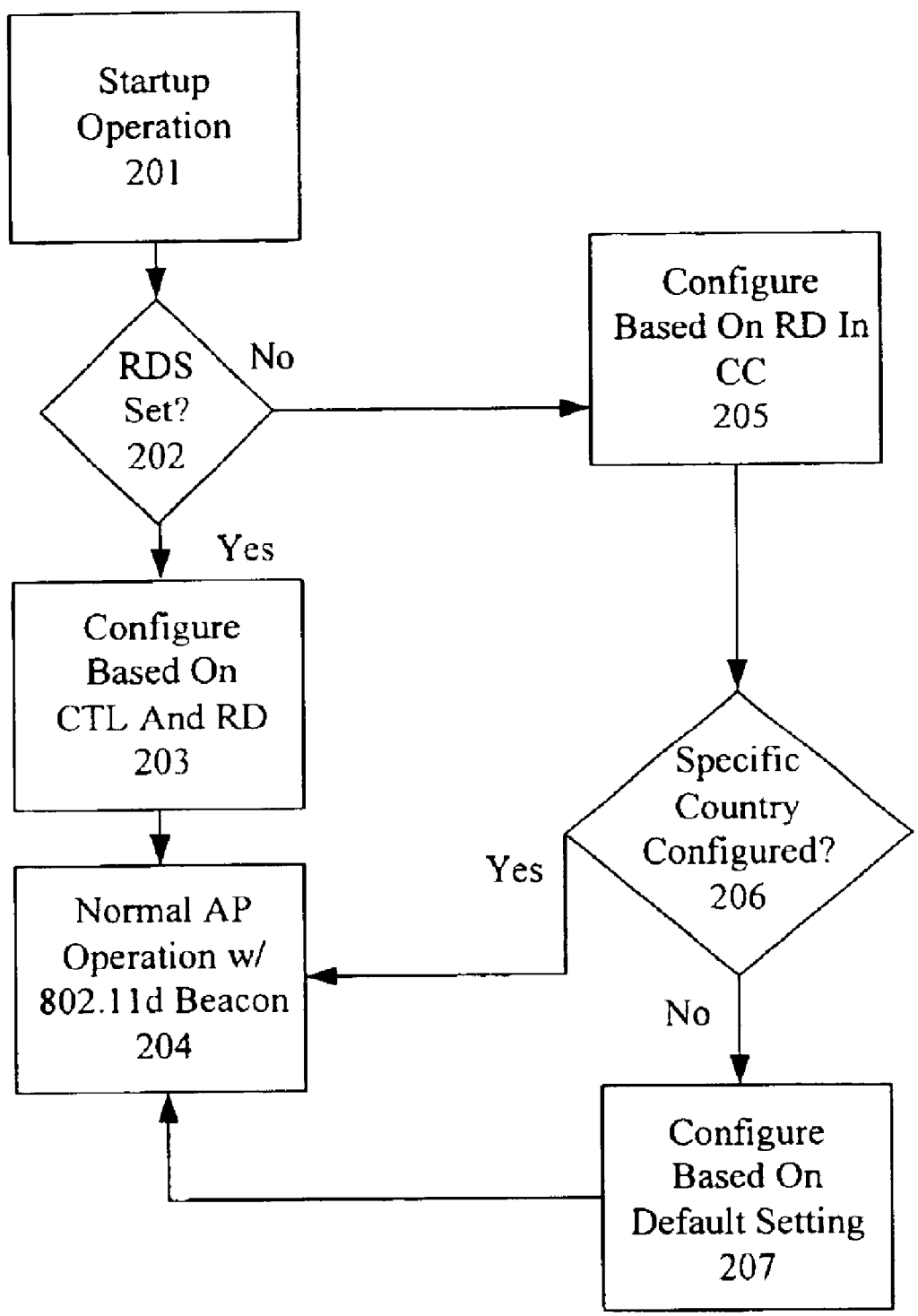
FIG. 2 illustrates a process flow that can be used by access point (AP) products to conform to worldwide regulations.

As described below, AP products and client products can operate using different process flows. FIG. 2 illustrates a process flow that can be used by AP products to conform to worldwide regulations. FIGS. 3–7 illustrate an exemplary process flow that can be used by client products to conform to worldwide regulations.

Access Point Operation

During a startup operation in step 201 (FIG. 2), an AP will read its conformance test limit (CTL), regulatory domain select (RDS), and country code (CC). If the regulatory domain select is "set" (indicating that the country code is an ISO or UN code, which specifies a particular country), as determined in step 202, then the AP will configure the channels available and maximum output power according to the conformance test limit and the regulatory domain (RD) for that country in step 203. In step 204, the AP can enter normal 802.11 operation and start sending an 802.11d beacon.

If the regulatory domain select is not set (indicating that the country code is a proprietary code, which designates a region), then the AP will configure itself according to the regulatory domain indicated by the region specified in the proprietary code in step 205. After the user configures the AP for a specific country, as determined in step 206, then the AP can enter normal 802.11 operation and start sending an 802.11d beacon (step 204). In one embodiment, the 802.11d beacon can include the country code, the available frequency or channel list, and the power levels of the AP.

Note that the available user configuration options may be limited. For example, the United States and Japan currently do not permit a user to configure the country code of an AP. Thus, if the user has not configured or cannot configure the AP for a specific country, then the AP can be configured based on a default setting in step 207. For example, if the proprietary code indicates the world domain, then the AP can default to the FCC1 regulatory domain and a NULL country code. After such default configuration, the AP can enter normal 802.11 operation and start sending an 802.11d beacon in step 204.

Client Product Operation

Figure 3:
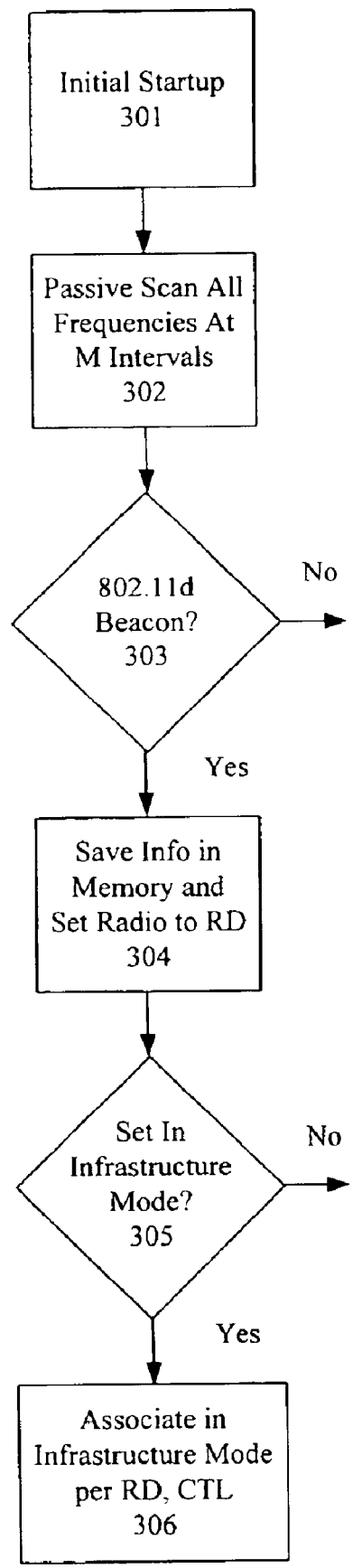
FIGS. 3–7 illustrate exemplary process flows that can be used by client products to conform to worldwide regulations.

FIG. 3 illustrates a portion of a process flow that can be used by a client product when it detects an 802.11d beacon and is set to an infrastructure mode. During an initial startup in step 301, a client product can read its conformance test limit (CTL), regulatory domain select (RDS) flag, country code (CC), and regulatory domain (RD). In accordance with one aspect of the invention, the conformance test limit, the regulatory domain select, and the country code can be read from their initial location in non-volatile memory (e.g. EEPROM or flash) during an initial startup on or upon return to factory configuration. These values along with the regulatory domain (which can be derived from the regulatory domain select and the country code) can be cached in a separate location (EEPROM, host computer registry, etc.) where they may be updated by subsequent information (e.g. an 802.11d beacon, an ad hoc beacon, an incomplete beacon, or an unknown beacon).

In step 302, the client product can passively scan all frequencies at a predetermined time interval. In one embodiment for a client product, the predetermined interval can be between 150 ms, which can be doubled during successive scans. According to the 802.11 standard, an AP must send out its lid beacon at least every 2 seconds. However, in practice, this interval can be significantly faster, e.g. on the order of 100–200 ms.

This time saving can become particularly relevant to 802.11a operation (5.0 GHz) because significantly more frequencies are provided than for 802.11b operation (2.4 GHz). For example, using a standard 2 second interval and assuming 802.11a operation, a client product could detect a beacon in as much as 1–2 minutes or even more. In contrast, using the 150 ms interval and assuming 802.11a operation, the client product may be able to detect the beacon in as few as 8 seconds or even less. In one embodiment, explained in reference to FIG. 6, if an AP is not found using this time interval in the first search stage, then another longer time interval can be used in a second search stage.

In step 303, if a client product fails to find an 802.11d beacon, then the client product can advantageously search for regulatory information from other sources, e.g. any information element, thereby allowing the client product to appropriately conform to its regulatory environment. This process will be explained in further detail in reference to FIG. 5.

If the client product detects an 802.11d beacon, then the client product saves the transmitted information in its non-volatile memory and sets its radio to the appropriate regulatory domain in step 304. In one embodiment, if multiple 802.11d beacons are detected with different country codes, then a client product can select the country code indicated by a majority of the 802.11d beacons. In this embodiment, if no majority is found, then the client product can use the first country code.

In step 305, the client product determines whether it is set to operate in an infrastructure mode. Note that a user actually sets the client product to one of the infrastructure mode and an ad hoc mode. If the client product is set to operate in an infrastructure mode, then the client product can associate in the infrastructure network in step 306 per the regulatory domain and the conformance test limit provided in the 802.11d beacon. Specifically, if the country code indicates any regulatory domain other than the world domain, the client product can configure itself to the regulatory domain and conformance test limit indicated by the regulatory domain select flag and the country code.

Figure 4:
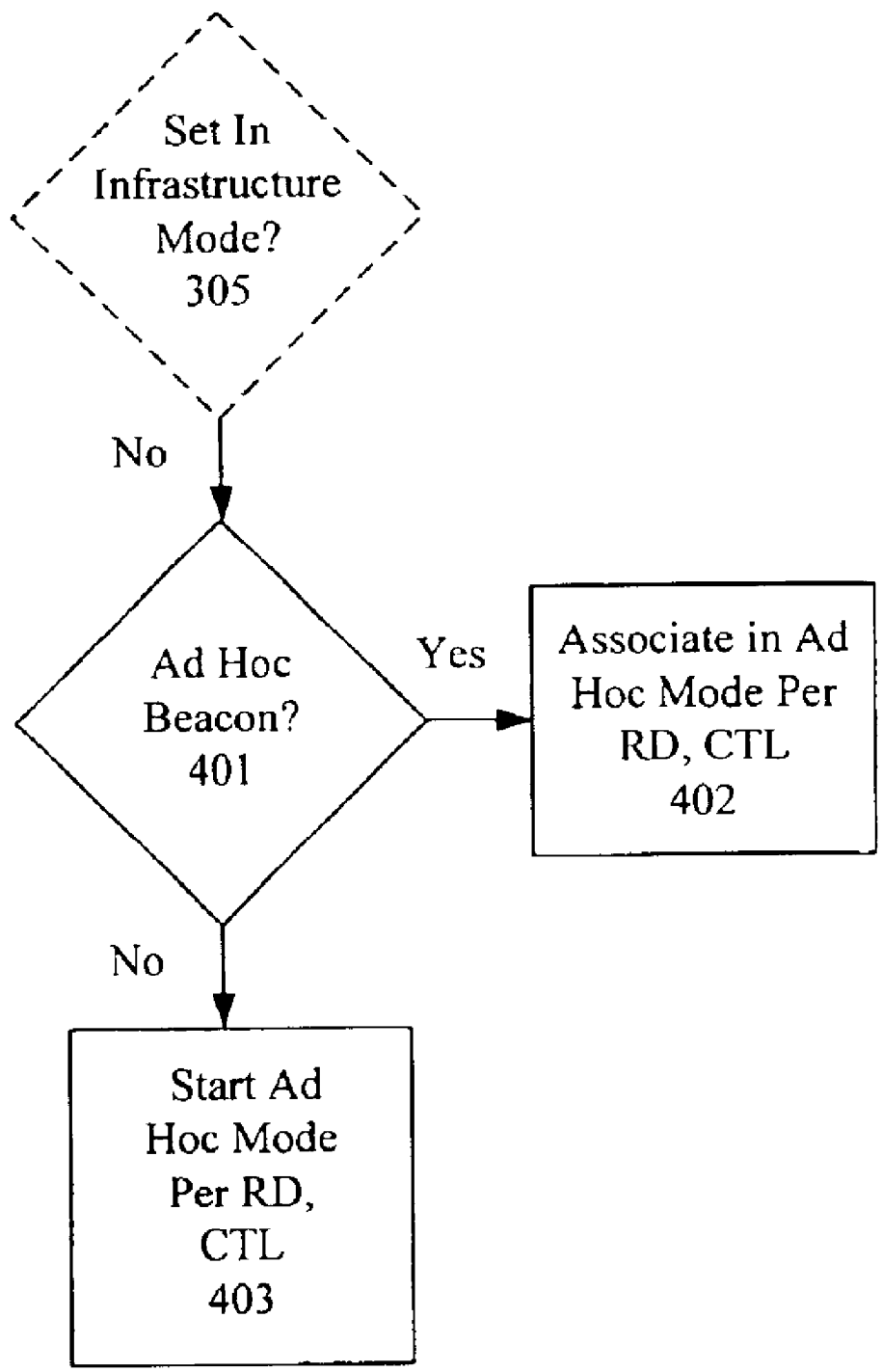

FIG. 4 illustrates a process flow when a client product detects an 802.11d beacon, but is set in the ad hoc mode. Specifically, after determining that it is not set to operate in an infrastructure mode in step 305, the Client product can conclude, by default, that it is set to operate in an ad hoc mode. At this point, the Client product can determine whether an ad hoc beacon is detected in step 401. This ad hoc beacon includes limited information, such as the name and security level, associated with an existing ad hoc network.

As previously mentioned, even if initially set to an ad hoc mode, the client product can extract valuable information from the 802.11d beacons, i.e. the conformance test limit, the country code, and the transmit output power levels, which can be used to facilitate communication for the client product in an ad hoc mode. In essence, a client product set for operation in an ad hoc mode can "overhear" the 802.11d beacon used for operation in an infrastructure mode. The 802.11d beacon provides regulatory information, which is not provided in an ad hoc beacon, thereby providing the client product with optimal operation flexibility. In this manner, after detecting an ad hoc beacon in step 401, the client product can associate with the clients in an existing ad hoc network in step 402 per the regulatory domain and conformance test limit transmitted in the 802.11d beacon. Advantageously, if an ad hoc beacon is not detected in step 401, then the client product can start its own ad hoc network in step 403 using the same regulatory domain and conformance test limit information derived from the 802.11d beacon. Note that the ad hoc beacon is only transmitted by the client that initiates an ad hoc network.

Figure 5:
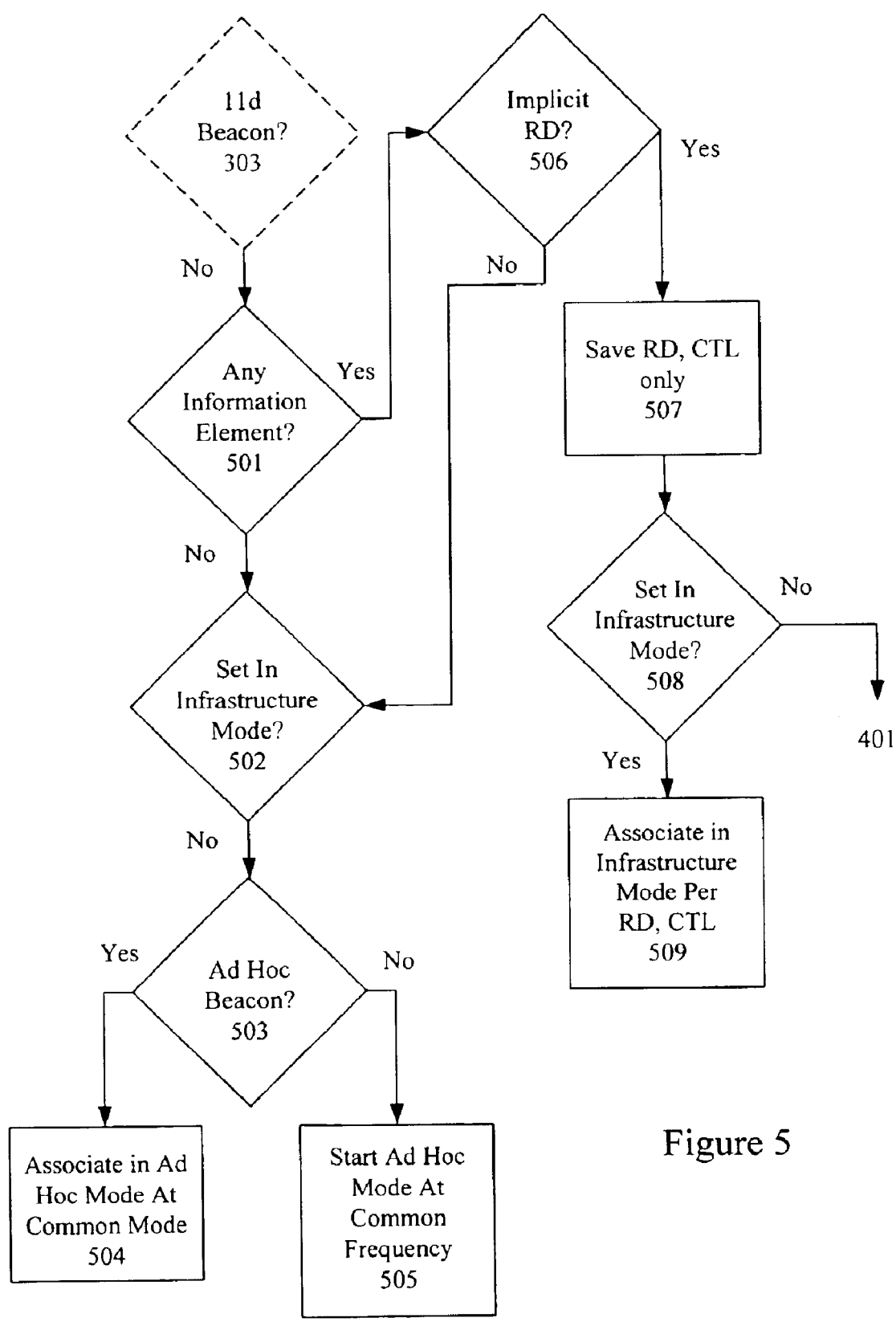

FIG. 5 illustrates a process flow that allows a client product to participate in a wireless communication network based on an information element. Specifically, if an 802.11d beacon is not detected in step 303, then the client product can determine whether any information element is detected in step 501. This information element could be an ad hoc beacon, an incomplete or non-applicable 802.11d beacon, or an unknown format beacon.

If any information element is detected, then the client product can determine whether the beacon includes an implicit regulatory domain in step 506. Deriving an implicit regulatory domain is possible when the channel on which a beacon is received corresponds to only one known regulatory domain and/or conformance test limit. To determine this correspondence, certain characteristics of the beacon can be analyzed. One such characteristic is the frequency of the beacon.

For example, if the beacon is at a frequency of 5.17 GHz, then the Client product can infer that it is operating in Japan because only Japan can use that specific frequency for its beacons. Similarly, if the beacon is at a frequency of 5.5 GHz, then the Client product can infer that it is operating in Europe because only European countries can use that specific frequency for beacons. In one embodiment, only three regulatory domains can be inferred. Specifically, the regulatory domain MKK1 can be inferred from frequencies of 5.170, 5.190, 5.210, and 5.230 GHz. Another regulatory domain ETSI1 can be inferred from frequencies from 5.470 to 5.725 GHz.

Yet another regulatory domain FCC1 can be inferred from detection of a proprietary modification of the 802.11a standard, called a turbo mode, developed by Atheros Communication, Inc., assignee of the present invention, and described in U.S. patent application Ser. No. 09/839,565, entitled "Multi-carrier Communication Systems Employing Variable Symbol Rates And Number Of Carriers, filed on Apr. 20, 2001, and incorporated by reference herein. This turbo mode is currently only approved for operation in the United States. Therefore, if the beacon is at these frequencies, then the client product can imply that it is operating in the United States.

For convenience, a list of exemplary regulatory domains for 5 GHz (802.11a) operation is provided in Table 1. These regulatory domains are illustrative only and may change without affecting the operation of a client product. Note that each frequency range has an associated average power.

TABLE 1

REGULATORY DOMAINS FOR 5 GHZ

| Regulatory Domain | Country/Countries | Frequency GHz | Power Av. dBm |
|---|---|---|---|
| FCC1 | United States, Puerto Rico, Philippines | 5.15–5.26 | 17 |
| | | 5.25–5.35 | 23 |
| | | 5.725–5.85 | 30 |
| FCC2 | Canada, Australia, New Zealand, Hong Kong SAR, Macau | 5.15–5.25 | 23 |
| | | 5.25–5.35 | 23 |
| | | 5.725–5.85 | 30 |
| ETSI1 | Belgium, Denmark, Finland, Ireland, Sweden, United Kingdome | 5.15–5.35 | 20 |
| | | 5.47–5.725 | 27 |
| ETSI2 | Germany, Italy, Poland, Switzerland | 5.15–5.25 | 18 |
| ETSI3 | Austria, France, Norway, Netherlands | 5.15–5.35 | 20 |
| ETSI4 | Greece, Iceland, Liechtenstein, Luxembourg, Portugal, Spain | 5.15–5.35 | 18 |
| MKK1 | Japan | 5.15–5.25 | 23 |
| APL1 | China, Argentina, Brazil, Chile, Columbia, Ecuador, Mexico, Panama, Peru, Venezuela | 5.725–5.85 | 30 |
| APL2 | Korea ROK | 5.725–5.825 | 23 |
| APL3 | Taiwan POC | 5.25–5.35 | 17 |
| | | 5.725–5.825 | 30 |
| APL4 | Singapore | 5.15–5.25 | 20 |
| | | 5.725–5.85 | 20 |

In a similar manner, a list of exemplary regulatory domains for 2.4 GHz (802.11b, 802.11g) operation is provided in Table 2. Once again, these regulatory domains are illustrative only and may change without affecting the operation of a client product.

TABLE 2

REGULATORY DOMAINS FOR 2.4 GHZ

| Regulatory Domain | Country/Countries | Frequency Channel | Power Av. dBm |
|---|---|---|---|
| WORLD | World | 1–13 | 20 |
| FCCA | United States and Canada | 1–11 | 27 |
| ETSIA | France | 10–13 | 20 |
| ETSIB | Israel | 5–7 | 20 |
| MKKA | Japan | 1–14 | 20 |
| APLA | Chile | 1–13 | 17 |
| APLB | China | 1–13 | 10 |

If a regulatory domain can be inferred in step 506, then the client product can save the regulatory domain and its associated conformance test limit in non-volatile memory in step 507. Note that an implicit regulatory domain might refer to a region (e.g. Europe) and therefore other information, such as the UN (country) code etc. is not stored at this time. In one embodiment, if multiple implicit regulatory domains are found (i.e. multiple beacons are detected, wherein such beacons indicate different implicit regulatory domains), then the first implicit regulatory domain can be used.

In step 508, the client product can determine whether it is set to operate in an infrastructure mode. If the client product is set to operate in an infrastructure mode, then the client product can associate in the infrastructure network in step 509 per the implicit regulatory domain and the conformance test limit. If the client product is not set to operate in an infrastructure mode, i.e. is set to operate in an ad hoc mode, then the process can return to step 401 (FIG. 4), which determines whether an ad hoc beacon is detected.

If no information element is detected (step 501) or, alternatively, no regulatory domain can be inferred (step 506), then the client product can determine whether it is set to an infrastructure mode in step 503. If it is not set to the infrastructure mode, then the client product can determine whether an ad hoc beacon is detected in step 503. If so, then the client product can associate with the AP in a common mode, i.e. the maximum average output power level that meets all regulatory domain requirements, in step 504. Current common mode settings can include: 17 dBm for 5.15 GHz to 5.25 GHz, 20 dBm for 5.25 to 5.85 GHz, and 20 dBm for 2.40 to 2.50 GHz.

If an ad hoc beacon is not detected in step 503, then in step 505 the client product can start its own ad hoc network at 5.25 GHz, i.e. 2.457 GHz in the 802.11b specification. This channel corresponds to a frequency that can be used in substantially all regulatory environments. Thus, the client product can advantageously start its own wireless network when it has exhausted all other possibilities for joining an existing wireless network.

Figure 6:
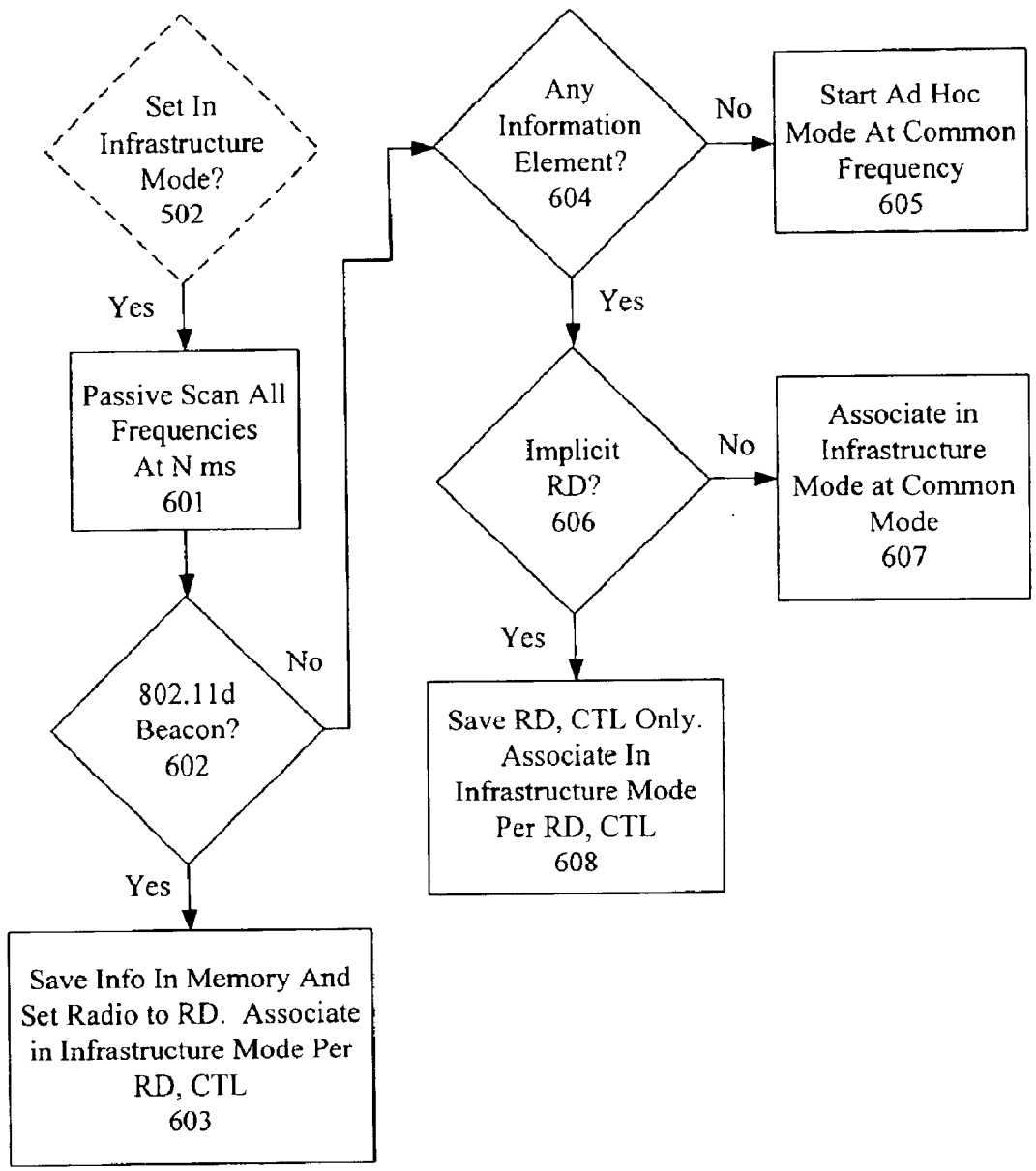

FIG. 6 illustrates a process flow when the client product, set to an infrastructure mode, has not detected any information element (step 501) and therefore increases its scanning interval. Specifically, in step 601, the client product can perform a passive scan of all frequencies at N ms second intervals. Of importance, this scan for an AP can be performed at a longer interval, thereby increasing the probability that the client product can detect an AP. In one embodiment, the first scan cycle can be performed at an interval of 150 ms, whereas the second scan cycle can be performed at an interval of 300 ms. Other embodiments can use different time intervals, wherein the first interval is M, the second interval is N, and M<N. In yet other embodiments, one or more additional scan cycles can be used, wherein each additional scan cycle increases the interval for detecting an AP.

If the client product detects an 802.11d beacon in step 602, then in step 603 the client product saves the transmitted information in its non-volatile memory, sets its radio to the appropriate regulatory domain, and associates in the infrastructure mode per the stored regulatory domain and conformance test limit. If an 802.11d beacon is not detected in step 602, then the client product can determine whether any information element is detected in step 604. As previously described, this information element could be an ad hoc beacon, an incomplete or non-applicable 802.11d beacon, or an unknown format beacon.

If any information element is detected, then the client product can determine whether an implicit regulatory domain can be inferred in step 606. If a regulatory domain can be inferred in step 606, then in step 608 the client product will only save the regulatory domain and its associated conformance test limit in non-volatile memory and associate in the infrastructure mode per that stored regulatory domain and the conformance test limit. If a regulatory domain cannot be inferred in step 606, then in step 607 the client product can associate in the infrastructure mode at the common mode. If the client product cannot detect any information element in step 604, then the client product can start its own ad hoc network at 2.457 GHz. Note that this process allows a client product, initially set in an infrastructure mode, to operate in an ad hoc network, thereby ensuring that the client product can communicate via some wireless network.

Figure 7:
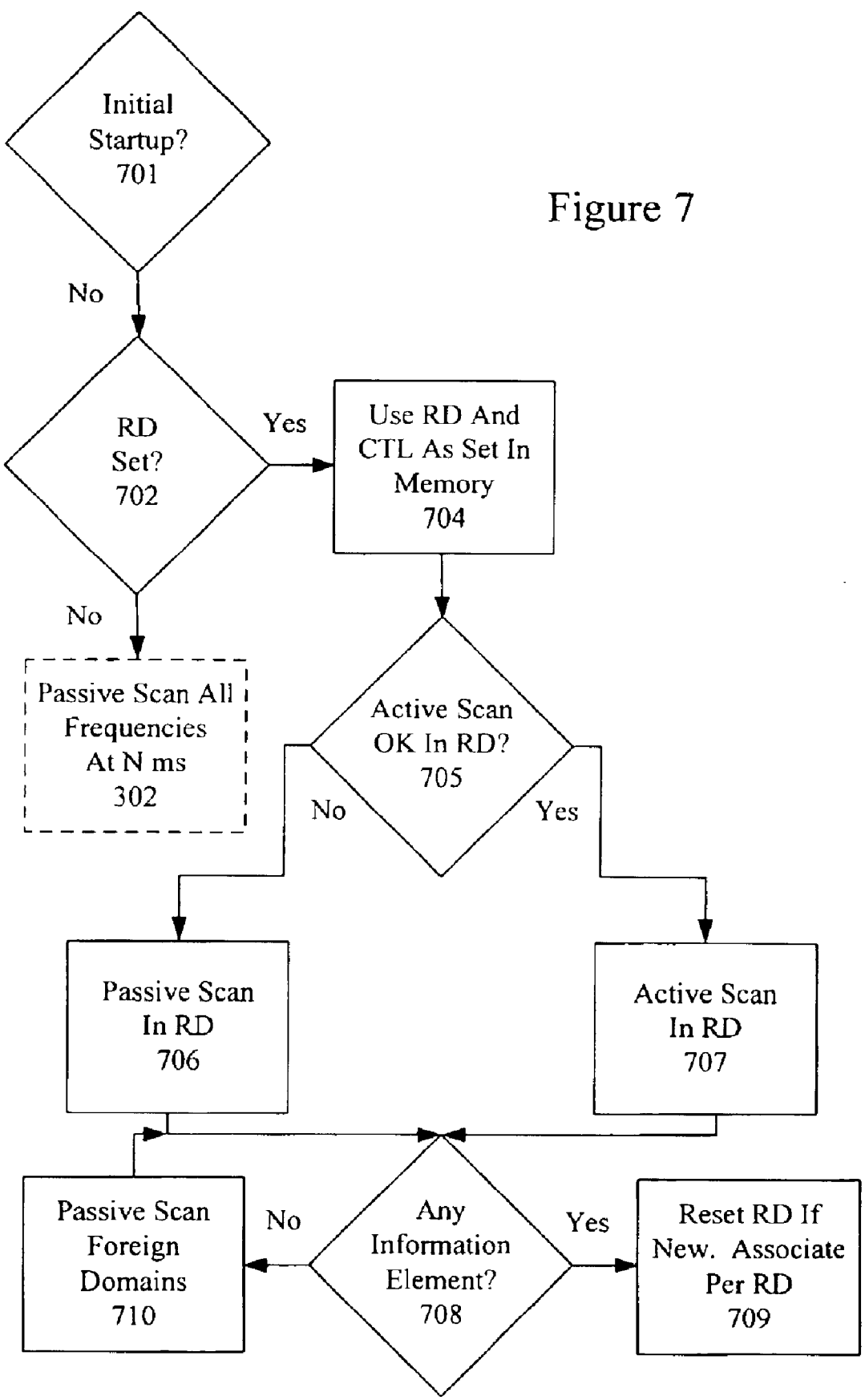

FIG. 7 illustrates one embodiment of a process flow that can be used by a client product if that client product has already been through an initial startup, as determined in step 701. If it is not an initial startup, then the client product can determine whether a regulatory domain has been set in step 702. If not, then the client product can return to step 302 (described above), wherein a passive scan can be performed at all frequencies at intervals of N ms. If a regulatory domain is set, then the client product can temporarily assume that that regulatory domain and any other information stored in the non-volatile memory is correct.

In step 705, the client product can determine whether an active scan is acceptable in that regulatory domain. In an active scan, the client product can go to each known frequency and send out a probe (i.e. a signal asking "Who's there?"). Because an AP can quickly respond to such a probe, an active scan generally can establish a network significantly faster than a passive scan in which the client product must wait to detect a beacon from an AP. If an active scan is not acceptable, then the client product can perform a passive scan in step 706. On the other hand, if acceptable, then the client product can perform an active scan in step 707. Note that the scans of steps 706 and 707 can be performed in either the infrastructure or ad hoc modes, as controlled by the stored information.

Based on the scan performed in step 706/707, the client product can determine whether any beacon was detected in step 708. If a beacon was detected, then the client product can reset itself as appropriate in step 709. For example, assume that the client product began operation in conformance with the regulatory domain of the United States. If a detected information element, e.g. an 802.11d beacon, indicates that the regulatory domain is Canada, then the client product would reset its regulatory domain for Canada. The client product would associate in the wireless network based on the most recent regulatory domain. If multiple conflicting information elements are received, then the client product can operate in the mode indicated by the majority of the information elements.

If an information element was not detected, then the client product can perform a passive scan of the frequencies in the foreign domains. In other words, the client product needs to confirm its previously set regulatory domain. The scan performed in step 706/707 was performed at the known frequencies based on the previously set regulatory domain. If an information element is not detected, thereby not allowing the necessary confirmation, then perhaps the regulatory domain was set in error. Thus, in step 710, other frequencies in other regulatory domains can be passively scanned. Steps 708 and 710 can be performed iteratively until an information element is detected and the regulatory domain can be confirmed or reset, as appropriate.

Note that the process flow described in reference to FIG. 7 can result in some transmission that is non-conforming. Therefore, this process flow would typically be used in countries where a limited non-conforming transmission is acceptable.

Non-Volatile Memory Configuration

Worldwide regulatory compliance requires the calibration and storage of appropriate conformance test limits and transmit power tables in non-volatile memory (e.g. EEPROM or flash memory). Although conformance test limits (CTLs) corresponding to multiple regulatory domains can be stored in non-volatile memory, manufacturers planning to ship multiple SKUs to a limited number of regulatory domains may simplify their manufacturing process and calibration time by only storing a single conformance test limit in each product.

Each wireless product includes on-board non-volatile memory (e.g. EEPROM for client products and flash memory for AP products). During manufacturing, product specific hardware configuration, such as the transmit power table (TPT), can be generated and stored in the non-volatile memory. In one exemplary client product, three TPT enable bits (for support of 802.11a, 802.11b, and 802.11g) can be provided along with corresponding TPTs. In one embodiment, the non-volatile memory can store conformance test limits for up to 32 regulatory domains.

If the regulatory domain select (RDS) is set, then the driver can configure the card according to the requirements set by the regulatory domain indicated by the specific country code. In an AP product, the ISO code corresponding to the country code can then be broadcast in the 802.11d beacon. If the regulatory domain select is not set, then the driver can configure the card according to the regulatory domain indicated by the proprietary (i.e. region) code. In one embodiment, the end user can set country-specific information (see step 207 in FIG. 2) via a configuration utility.

In one embodiment, the non-volatile memory can also store the antenna gain and cable loss information. The driver can take this information into consideration when determining the maximum output power for particular domains. Specifically, most regulatory domains (except the United States) are specified in dBm (i.e. a power measurement) including antenna gain while others (including the including the United States) specify power measurements excluding antenna gain and therefore require compensation.

Frequency Designations

Note further that frequency can be designated by GHz (under the 5.0 GHz convention) or by channel number (under the 2.4 GHz convention). For example, channel number 1 refers to 2.412 GHz, channel number 2 refers to 2.417 GHz, etc. The 802.11 standard defines the mapping between channel numbers and GHz.

Transmit Output Power Configuration

Multiple transmit power tables (TPTs) including information relevant to the 802.11a, 802.11b, and 802.11g standards can be provided in the client product. In one embodiment, once a channel is selected, a driver can read the TPT mode enable bits stored in non-volatile memory and, based on those bits and TPTs, set the maximum output power capability of the client product. In one embodiment, only a few key frequency channels' data are stored in non-volatile memory for efficiency. Therefore, the maximum output power capability of the client product can be determined by interpolation.

In one embodiment, the driver can set the maximum output power by choosing the minima of the following four constraints: a product's raw hardware capability (as indicated by the transmit power table), a maximum output power allowed for a specific frequency and regulatory domain (as indicated via software), a conformance test limit as required at band edge to pass emission requirement for a regulatory domain at a particular frequency (provided by both hardware and software), and a common mode (if required by software). Note that the maximum output power must compensate for the antenna gain/cable information (which is also stored in non-volatile memory, as required in most regulatory domains).

Other Embodiments

It will be understood that the disclosed embodiments regarding worldwide regulatory conformance are exemplary and not limiting. For example, in one embodiment, a first scanning interval (step 302 of FIG. 3) could be at approximately 100 ms, a second scanning interval (step 601 of FIG. 6) could be at approximately 250 ms, and a third scanning interval (not shown in the figures) could be at approximately 300 ms. Note that an AP can continue to send its 802.11d beacon even when at its maximum client load (and thus physically unable to add a new client). Under such circumstances, the client product can enter into an inactive state while waiting for the opportunity to participate in the infrastructure mode. In another embodiment, if an infrastructure communication mode is not currently available, a client product can advantageously determine if an existing ad hoc network is available. Accordingly, it is intended that the scope of the invention be defined by the following Claims and their equivalents.

I claim:

1. A method of conforming a wireless networking client product to a regulatory environment, the method comprising:
    passively scanning all frequencies at a first interval for a beacon;
    if receiving a beacon, then extracting relevant information from the beacon and operating in one of an infrastructure mode and an ad hoc mode based on the relevant information; and
    if not receiving a beacon, then operating in the ad hoc mode at a frequency acceptable in substantially all regulatory environments, wherein if receiving the beacon, and the beacon is not an 802.11d beacon, then further including determining whether a regulatory domain can be inferred.

2. An automatic startup process for a client product, the process ensuring permissible operation in an unknown regulatory environment, the process comprising:
    passively scanning all frequencies at a first interval for a beacon;
    if an 802.11d beacon is found, wherein the 802.11d beacon indicates a regulatory domain, then determining whether the client product is set in one of an infrastructure mode and an ad hoc mode;

if set in the infrastructure mode, then associating in the infrastructure mode in a wireless network using the regulatory domain derived from the 802.11d beacon; and if set in the ad hoc mode, then operating in the ad hoc mode in the wireless network using the regulatory domain derived from the 802.11d beacon, wherein if the 802.11d beacon is not found then searching for any beacon;

if no beacon is found, then determining whether the client product is set in the infrastructure mode;

if the client product is not set in the infrastructure mode, then searching for an ad hoc beacon; and if an ad hoc beacon is found, then associating in a common mode in the wireless network, the common mode referring to a maximum average output power level meeting substantially all regulatory environments.

3. The method of claim 2, wherein the common mode includes one of 17 dBm for 5.15 GHz to 5.25 GHz, 20 dBm for 5.25 GHz to to 5.85 GHz, and 20 dBm for 2.40 to 2.50 GHz.

4. The method of claim 2, wherein if an ad hoc beacon is not found, then initiating the ad hoc mode at a frequency acceptable in substantially all regulatory environments.

5. The method of claim 4, wherein the usable frequency includes 2.457 GHz or Channel 10.

6. The method of claim 2, wherein if a beacon is found, then determining whether an implicit regulatory domain can be inferred from the beacon, wherein the implicit regulatory domain refers to one of a frequency on which an information element is received and a detected mode of operation corresponds to only one regulatory domain.

7. The method of claim 6, wherein if an implicit regulatory domain is not provided, then returning to determining whether the client is set in the infrastructure mode.

8. The method of claim 6, wherein if an implicit regulatory domain is provided, then saving the regulatory domain;

if the client product is set in the infrastructure mode, then associating in the infrastructure mode in the wireless network based on the regulatory domain; and if the client product is not set in the infrastructure mode, then returning to searching for an ad hoc beacon.

9. The method of claim 2, wherein if the client product is set in the infrastructure mode, then passively scanning all frequencies at a second interval, wherein the second interval is longer than the first interval.

10. The method of claim 9, further including determining whether an 802.11d beacon is found using the second time interval;

if the 802.11d beacon is found, then associating in the infrastructure mode in the wireless network using a regulatory domain derived from the 802.11d beacon.

11. The method of claim 10, further including if the 802.11d beacon is not found, then searching for any beacon;

if a beacon is not found, then starting an ad hoc mode at a frequency acceptable in substantially all regulatory environments.

12. The method of claim 11, further including if a beacon is found, then determining whether a regulatory domain can be inferred from the beacon.

13. The method of claim 12, further including if an implicit regulatory domain is provided, then saving the regulatory domain; and associating in the infrastructure mode in the wireless network using the regulatory domain.

14. The method of claim 12, further including if an implicit regulatory domain is not provided, then associating in the infrastructure mode in the common mode.

15. A wireless device operational in an unknown regulatory environment, the wireless device including software for performing the following steps:

passively scanning all frequencies at a first interval for a beacon;

if receiving a beacon, then extracting relevant information from the beacon and operating in one of an infrastructure mode and an ad hoc mode based on the relevant information; and if not receiving a beacon, then operating in the ad hoc mode at a frequency acceptable in substantially all regulatory environments, wherein if receiving the beacon, and the beacon is not an 802.11d beacon, then further including determining whether an implicit regulatory domain can be interred.

16. Software for ensuring permissible operation of a wireless device in an unknown regulatory environment, the software comprising:

code for passively scanning all frequencies at a first interval for a beacon;

code, if receiving a beacon, for extracting relevant information from the beacon and operating in one of an infrastructure mode and an ad hoc mode based on the relevant information;

code, if not receiving a beacon, for operating in the ad hoc mode at a usable frequency in substantially all regulatory environments; and code, if receiving a non-802.11d beacon, for determining whether a regulatory domain can be inferred.

17. A method for conforming a client product to a regulatory environment, the client product having finished its initial startup, the method comprising:

determining whether a regulatory domain is set;

if the regulatory domain is set, then using the regulatory domain and an associated conformance test limit as a temporary setting;

determining whether an active scan is permissible in the regulatory domain;

if permissible, then actively scanning in the regulatory domain;

if not permissible, then passively scanning in the regulatory domain;

based on the scanning, determining whether any beacon is detected;

if a beacon is detected, then resetting the regulatory domain if different and converting the temporary setting into a confirmed setting;

if no beacon is detected, then passively scanning foreign domains until a beacon is detected; and associating in a wireless network based on the regulatory domain in the confirmed setting.

* * * * *